United States Patent
Alabbas et al.

(10) Patent No.: US 10,092,860 B2
(45) Date of Patent: Oct. 9, 2018

(54) SEPARATION UNIT FOR MICROBIAL AND SCALE TREATMENT

(71) Applicant: Saudi Arabian Oil Company, Dhahran (SA)

(72) Inventors: Faisal M. Alabbas, Dhahran (SA); Anthony Kakpovbia, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/606,912

(22) Filed: May 26, 2017

(65) Prior Publication Data
US 2017/0266585 A1    Sep. 21, 2017

Related U.S. Application Data

(62) Division of application No. 14/262,173, filed on Apr. 25, 2014, now Pat. No. 9,694,303.

(51) Int. Cl.
*B01D 17/00* (2006.01)
*C02F 1/48* (2006.01)
(Continued)

(52) U.S. Cl.
CPC .............. *B01D 17/00* (2013.01); *C02F 1/488* (2013.01); *C02F 2101/32* (2013.01); *C02F 2103/10* (2013.01); *C02F 2303/20* (2013.01)

(58) Field of Classification Search
CPC ...... B01D 17/00; C02F 1/488; C02F 2101/32; C02F 2103/10; C02F 2303/20
See application file for complete search history.

(56) References Cited

U.S. PATENT DOCUMENTS

| | | | |
|---|---|---|---|
| 2,258,194 A | 10/1941 | Queneau | |
| 2,939,580 A | 6/1960 | Carpenter | |

(Continued)

FOREIGN PATENT DOCUMENTS

| | | | |
|---|---|---|---|
| CA | 2640019 A1 | 4/2009 | |
| EP | 0263344 A1 | 4/1988 | |

(Continued)

OTHER PUBLICATIONS

International Search Report and Written Opinion for PCT application PCT/US2015/026758; International Filing Date Apr. 21, 2015; Report dated Sep. 3, 2015 (pp. 1-13).

(Continued)

*Primary Examiner* — David C Mellon
(74) *Attorney, Agent, or Firm* — Bracewell LLP; Constance Gall Rhebergen

(57) ABSTRACT

A method to continuously clean a fouled process stream using a magnetic field comprising feeding the fouled process stream, comprising a fouling constituent, to a magnetic separation unit. The magnetic separation unit comprising a separation vessel configured to receive the fouled process stream, a mounted magnet configured to generate the magnetic field operable to reduce a concentration of the fouling constituent. The mounted magnet comprising a magnet motor configured to rotate a shaft, the shaft configured to rotate a magnet, and the magnet configured to generate the magnetic field. A circulation pump fluidly connected to the separation vessel and a sampling point configured to allow removal of a sample. The method further includes measuring the concentration of the fouling constituent in the sample and supplying an effluent stream from the separation vessel to a clean collection vessel.

9 Claims, 7 Drawing Sheets

(51) Int. Cl.
*C02F 103/10* (2006.01)
*C02F 101/32* (2006.01)

(56) References Cited

U.S. PATENT DOCUMENTS

| | | |
|---|---|---|
| 3,960,716 A | 6/1976 | Spodig |
| 4,167,480 A | 9/1979 | Mach |
| 4,226,714 A | 10/1980 | Furness et al. |
| 4,904,381 A | 2/1990 | Urakami |
| 4,933,088 A * | 6/1990 | Nishimura ............... C02F 1/481 210/695 |
| 5,628,900 A | 5/1997 | Naito |
| 5,660,723 A | 8/1997 | Sanderson |
| 5,816,058 A | 10/1998 | Lee et al. |
| 6,171,490 B1 | 1/2001 | Kim |
| 6,200,486 B1 | 3/2001 | Chahine et al. |
| 6,896,815 B2 | 5/2005 | Cort |
| 7,250,994 B2 | 7/2007 | Nishi |
| 7,371,320 B2 | 5/2008 | Yoda et al. |
| 7,520,994 B2 * | 4/2009 | Dong ..................... B01D 15/00 210/661 |
| 7,691,269 B2 | 4/2010 | Cort |
| 2006/0006114 A1 | 1/2006 | Deskins |
| 2006/0049110 A1 | 3/2006 | Shallcross |
| 2007/0012556 A1 | 1/2007 | Lum et al. |
| 2008/0023401 A1 | 1/2008 | Arato et al. |
| 2008/0029457 A1 | 2/2008 | Saho et al. |
| 2008/0073268 A1 | 3/2008 | Cort |
| 2008/0237098 A1 * | 10/2008 | Saho ........................ B03C 1/12 210/137 |
| 2008/0264607 A1 | 10/2008 | Hebert |
| 2011/0139721 A1 | 6/2011 | Miyabayashi et al. |
| 2011/0168639 A1 * | 7/2011 | Isogami .................. C02F 1/488 210/695 |

FOREIGN PATENT DOCUMENTS

| | | |
|---|---|---|
| JP | H06165991 A | 6/1994 |
| JP | 20021922160 A | 7/2002 |
| JP | 2011016117 A | 1/2011 |
| WO | WO20040007377 A1 | 1/2004 |
| WO | WO20080039936 A2 | 4/2008 |

OTHER PUBLICATIONS http://www.amazon.com/Large-Magnetic-Water-Conditioner-Treatment/dp/B0012DNFU6; Large Magnetic Water Conditioner—Magnet Water Treatment—No Salt Water Softener; accessed Nov. 5, 2013 (pp. 1-5).

Quinn, C. J., et al., "Magnetic Treatment of Water Prevents Mineral Build-Up"; Iron and Steel Engineer; Jul. 1997; pp. 47-53.

* cited by examiner

SEPARATION UNIT FOR MICROBIAL AND SCALE TREATMENT

RELATED APPLICATIONS

This application is a divisional application of U.S. patent application Ser. No. 14/262,173 filed on Apr. 25, 2014. For purposes of United States patent practice, this application incorporates the contents of the application by reference in its entirety.

FIELD OF THE INVENTION

This invention relates to a method and apparatus for cleaning a process stream. More specifically, this invention provides a method and apparatus for removing micro-organisms and scale from a process stream containing hydrocarbons and water.

BACKGROUND OF THE INVENTION

Oil and gas pipelines, containing hydrocarbons and water, also contain indigenous micro-organisms. The pipelines are a natural environment for such micro-organisms to reside and flourish over time. The build-up of micro-organisms, or bio-fouling, can lead to a block or clog in the pipeline system. If not treated, the bio-fouling will corrode the pipe and other pipeline equipment through a process known as microbiologically influenced corrosion (MIC) or bio-corrosion. In the oil and gas industry, over 20% of annual economic losses are attributable to MIC.

Various commercial mitigation techniques exist to combat bio-fouling. Mechanical approaches (i.e pigging), chemical approaches (i.e biocides), electrochemical approaches (i.e cathodic protection), and biological approaches (i.e. microbial injection of more beneficial microbiota) are all used to stop or prevent bio-fouling. Biocides are considered the most effective technique. Biocides, however, pose their own concerns. Biocides are expensive, can be toxic, can pose considerable hazards to the environment, and can be difficult to dispose.

A solution to tackle and prevent bio-fouling that has the efficacy of biocides, but is environmentally friendly is desired. A solution that reduces exposure to and the expense of biocides and corrosion inhibitors, while still controlling microbial and scale corrosion is desired.

In order to replace biocides, any solution must be capable of addressing bio-fouling on an industrial scale. Industrial scale-up is a considerable part of any process. A solution that exists on a pilot size, or small batch scale, may not function the same as an industrial scale process. Larger vessels dissipate energy, such as energy due to mixing, at a different rate than smaller vessels. Vessel size also affects heat transfer. Additionally, the rate of reaction may not be the same on a larger scale, thus the mixing employed must be carefully considered for scale up.

SUMMARY OF THE INVENTION

This invention relates to a method and apparatus for cleaning a process stream. More specifically, this invention provides a method and apparatus for removing micro-organisms and scale from a process stream containing hydrocarbons and water.

In a first aspect of the present invention, a method to continuously clean a fouled process stream using a magnetic field is provided. The method includes the steps of feeding the fouled process stream to a magnetic separation unit, the fouled process stream includes a fouling constituent. The magnetic separation unit includes a separation vessel, the separation vessel configured to receive the fouled process stream, the separation vessel having a body with an external surface, the body defining an interior cavity, a mounted magnet partially adjacent to the separation vessel, the mounted magnet configured to generate the magnetic field, the magnetic field operable to reduce a concentration of the fouling constituent. The mounted magnet includes a magnet motor adjacent to the external surface of the separation vessel, the magnet motor configured to rotate a shaft, the shaft connected to the magnet motor and extending into the interior cavity of the body of the separation vessel, the shaft configured to rotate a magnet, and the magnet affixed to the shaft, the magnet having a shape, the magnet configured to generate the magnetic field, wherein the rotation of the magnet generates the magnetic field. The magnetic separation unit also includes a circulation pump fluidly connected to the separation vessel, the circulation pump configured to receive a circulation feed from the separation vessel to produce a circulation return, wherein the circulation return is recycled to the separation vessel, and a sampling point fluidly connected to the separation vessel, the sampling point configured to allow removal of a sample. The method further includes the steps of measuring the concentration of the fouling constituent in the sample, and supplying an effluent stream from the separation vessel to a clean collection vessel when the concentration of the fouling constituent in the sample is below a target concentration.

In certain embodiments of the present invention, the method further includes additional magnetic separation units, wherein the additional magnetic separation units are connected in a series, with the effluent stream of a first magnetic separation unit in the series fed to a next magnetic separation unit in the series, with the effluent stream of a last magnetic separation unit in the series fed to the clean collection vessel. In certain embodiments of the present invention, the method includes additional mounted magnets within the separation vessel. In certain embodiments of the present invention, the method the process stream comprises water, hydrocarbons, and combinations thereof. In certain embodiments of the present invention, the fouling constituent is selected from the group consisting of micro-organisms, paramagnetic scale, ferromagnetic scale, and combinations thereof. In certain embodiments of the present invention, the magnet comprises neodymium. In certain embodiments of the present invention, the shape of the magnet is selected from the group consisting of a sphere, a ring, a cylinder, a cube, and a rectangular prism. In certain embodiments of the present invention, the shaft further includes additional magnets, the magnets having an arrangement along the shaft. In certain embodiments of the present invention, the sampling point is located between the separation vessel and the circulation pump. In certain embodiments of the present invention, the target concentration is 100 cells/ml of the sample.

In a second aspect of the present invention, a microbiological treatment unit for cleaning a fouling constituent from a fouled process stream using a magnetic field is provided. The microbiological treatment unit includes a magnetic separation unit, the magnetic separation unit configured to reduce a concentration of the fouling constituent in the fouled process stream to create an effluent stream. The magnetic separation unit includes a separation vessel, the separation vessel configured to receive the fouled process stream, the separation vessel having a body with an external surface, the body defining an interior cavity, a mounted magnet partially adjacent to the separation vessel, the mounted magnet configured to generate the magnetic field, the magnetic field operable to remove the fouling constituent, the mounted magnet includes a magnet motor adjacent to the external surface of the separation vessel, the magnet motor configured to rotate a shaft, the shaft connected to the magnet motor and extending into the interior cavity of the body of the separation vessel, the shaft configured to rotate a magnet, and the magnet connected to the shaft, the magnet having a shape, the magnet configured to generate the magnetic field, wherein the rotation of the magnet generates the magnetic field. The magnetic separation unit further includes a circulation pump fluidly connected to the separation vessel, the circulation pump configured to receive a circulation feed from the separation vessel to produce a circulation return, wherein the circulation return is recycled to the separation vessel. The microbiological treatment unit further includes a sampling point fluidly connected to the separation vessel, the sampling point configured to allow removal of a sample and a clean collection vessel, the clean collection vessel configured to receive the effluent stream.

In certain embodiments of the present invention, the microbiological treatment unit further includes additional magnetic separation units, wherein the additional magnetic separation units are connected in series, where the effluent stream of a first magnetic separation unit is fed to a next magnetic separation unit in the series, where the effluent stream of a last magnetic separation unit in the series is fed to the clean collection vessel. In certain embodiments of the present invention, the microbiological treatment further includes additional mounted magnets within the separation vessel. In certain embodiments of the present invention, the process stream comprises water, hydrocarbons, and combinations thereof. In certain embodiments of the present invention, the fouling constituent is selected from the group consisting of biological micro-organisms, paramagnetic scale, ferromagnetic scale, and combinations thereof. In certain embodiments of the present invention, the magnet comprises neodymium. In certain embodiments of the present invention, the shape of the magnet is selected from the group consisting of a sphere, a ring, a cylinder, a cube, and a rectangular prism. In certain embodiments of the present invention, the further includes additional magnets, the magnets having an arrangement along the shaft, wherein the arrangement along the shaft is continuous, rows, or patterned. In certain embodiments of the present invention, the sampling point is located between the separation vessel and the circulation pump.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 6b is an image of the magnetic field strength in the magnetic tower assembly of FIG. 6a.

DETAILED DESCRIPTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Figure 1:
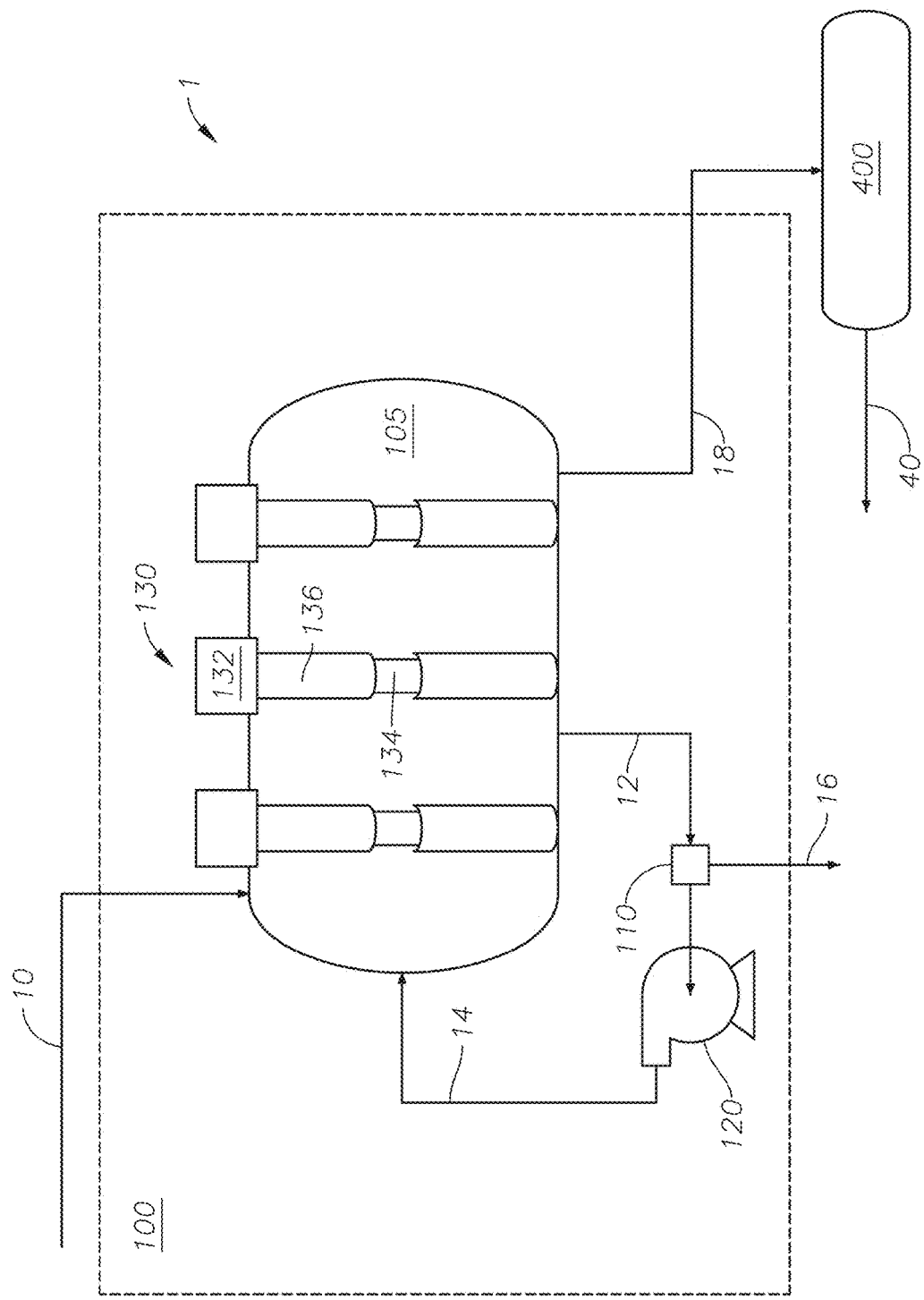
FIG. 1 is a plan view of an embodiment of microbiologic treatment unit 1.

FIG. 1 provides an embodiment of microbiological treatment unit 1. Microbiological treatment unit 1 removes the fouling constituent present in fouled process stream 10 to produce clean stream 40. Microbiological treatment unit 1 treats a process stream on an industrial scale. In at least one embodiment of the present invention, microbiological treatment unit 1 is a continuous process. In an alternate embodiment of the present invention, microbiological treatment unit 1 is a batch process. In an alternate embodiment of the present invention, microbiological treatment unit 1 is in the absence of a batch process.

Fouled process stream 10 is any process stream containing hydrocarbons, water, and combinations thereof. In at least one embodiment of the present invention, fouled process stream 10 is a multi-phase stream of hydrocarbons and water. In at least one embodiment of the present invention, fouled process stream 10 is in the absence of potable water. In at least one embodiment of the present invention, fouled process stream 10 is crude oil. In at least one embodiment of the present invention, fouled process stream 10 is part of a waste water treatment process. In at least one embodiment of the present invention, fouled process stream 10 is part of a water purification process. In at least one embodiment of the present invention, fouled process stream 10 is a waste stream from a mining operation. In at least one embodiment of the present invention, fouled process stream 10 is a stream from a process involving ferromagnetic materials. In at least one embodiment of the present invention, fouled process stream 10 is a stream from a hydro-metallurgical process involving magnetic materials. In at least one embodiment of the present invention, fouled process stream 10 is from a pipeline transportation process.

The fouling constituent is any element that can cause structural changes to the inside of a pipe or vessel. Exemplary structural changes include corrosion and deposits on the surface. In at least one embodiment, the corrosion is due to bio-corrosion. In at least one embodiment of the present invention, the deposits are due to scale. Exemplary fouling constituents include micro-organisms, paramagnetic scale, ferromagnetic scale, and combinations thereof. As used herein "micro-organisms" encompasses biological micro-organisms, indigenous micro-organisms, micro-flora, and other minute biological organisms occurring in fluids that can cause bio-fouling and/or bio-corrosion. Exemplary micro-organisms include Arachea, bacteria, and fungi. In one embodiment of the present invention, the fouling constituent is picked up by the process stream along the flow path of the process stream.

Fouled process stream 10 feeds into separation vessel 105 of magnetic separation unit 100. Magnetic separation unit 100 reduces the concentration of the fouling constituent in fouled process stream 10 to create effluent stream 18. Separation vessel 105 is any vessel having an external surface and a body with an interior cavity that is capable of receiving fouled process stream 10. Exemplary separation vessels 105 include separators, horizontal separators, multiphase separators, and vessels with a settling area for solids collection. In a preferred embodiment of the present invention, separation vessel 105 is a horizontal separator.

Mounted magnet 130 generates the magnetic field in separation vessel 105. Mounted magnet 130 includes magnet motor 132, shaft 134, and magnet 136. The number of mounted magnets 130 mounted partially adjacent to separation vessel 105 depends on the fluid capacity of separation vessel 105 and the volume of fouled process stream 10 to be cleaned. Separation vessel 105 can have one mounted magnet, alternately more than one, alternately one or two, alternately between one and three, alternately between one and four, alternately between one and five, alternately two or three, alternately between two and four, alternately between two and five, alternately three or four, alternately between three and five, alternately four or five, alternately five or more. In a preferred embodiment of the present invention, separation vessel 105 has three mounted magnets 130.

Magnet motor 132 rotates shaft 134. Magnet motor 132 is adjacent to the external surface of separation vessel 105. Magnet motor 132 can be any type of motor capable of rotating a shaft. In at least one embodiment of the present invention, magnet motor 132 is an electric motor. In at least one embodiment of the present invention, magnet motor 132 is a variable speed electric motor.

Shaft 134 rotates magnet 136. Shaft 134 is connected to magnet motor 132 and extends into the interior cavity of the body of separation vessel 105. In at least one embodiment of the present invention, shaft 134 is anchored to separation vessel 105 at a point opposite magnet motor 132. In at least one embodiment of the present invention, shaft 134 is vertically oriented. In at least one embodiment of the present invention, shaft 124 extends vertically into the interior cavity of separation vessel 105 and is anchored at a point opposite magnet motor 132, such that the anchor allows shaft 134 to rotate around the vertical axis, but does not allow shaft 134 to shift in a plane perpendicular to the vertical axis.

The rotation of magnet 136 generates the magnetic field. Magnet 136 is affixed to shaft 134. In at least one embodiment of the present invention, magnet 136 is permanently affixed to shaft 134. In at least one embodiment of the present invention, magnet 136 is removably affixed to shaft 134. In one embodiment of the present invention, shaft 134 runs through magnet 136. In an alternate embodiment of the present invention, shaft 134 is equipped with magnet 136 without shaft 134 passing through a plane of magnet 136. Magnet 136 can have any shape capable of generating the magnetic field. Exemplary shapes include a sphere, a ring, a cylinder, a cube, a rectangular prism, and other polyhedrons. In at least one embodiment, the shape of magnet 136 is a ring. In at least one embodiment of the present invention, magnet 136 is a cylinder with shaft 134 running through the center of the cylinder, such that magnet 136 is affixed around shaft 134. In an alternate embodiment of the present invention, magnet 136 is a rectangular prism. Magnet 136 can be of any material capable of generating a magnetic field. Exemplary materials include neodymium, samarium, cobalt, boron, iron, ceramics, and combinations thereof. In a preferred embodiment of the present invention, magnet 136 is neodymium.

In at least one embodiment of the present invention, shaft 134 has additional magnets 136 attached. The total number of magnets 136 affixed to a single shaft 134 is dictated by the length and size of shaft 134, the size of magnets 136, the size of separation vessel 105, and the density of the magnetic field desired. Additional magnets 136 are affixed to shaft 134 in arrangements along shaft 134. Exemplary arrangements include a continuous line, rows, and patterns. Exemplary patterns include alternating sides of shaft 134 and alternating shapes of magnets 136. The arrangement of magnets 136 is determined by the size and shape of the magnetic field needed, the size of shaft 134, and the size of separation vessel 105. In at least one embodiment of the present invention, the size, shape, material, and arrangement of magnets 136 are determined in consideration of the flow rate of fouled process stream 10 and clean stream 40, along with the coagulation efficiency of magnetic separation unit 100 required. In a preferred embodiment, shaft 134 includes multiple rectangular prism shaped magnets 136 affixed surrounding shaft 134, with each magnet 136 connected by a dismantling joint to another magnet 136.

Circulation feed 12 exits separation vessel 105 and is returned through circulation pump 120 as circulation return 14. Circulation pump 120 recycles fluid from and to separation vessel 105. The circulation creates a circulating fluid within separation vessel 105. The circulating fluid has a flow profile to ensure the fluid interacts with the magnetic field. Exemplary flow profiles include laminar flow and turbulent flow.

The magnetic field removes the fouling constituent from the circulating fluid inside separation vessel 105. The magnetic field has a magnetic field strength or magnetic flux density. The magnetic field strength can be between greater than about 1 miliTesla (mT), alternately between about 1 mT and about 0.1 T, alternately between about 0.1 T and about 1 T, alternately between 0.1 T and about 0.5 T, alternately between about 0.5 T and about 1 T, alternately greater than 1 T, alternately greater than 5 T, alternately greater than 10 T. In at least one embodiment of the present invention, the magnetic field strength is 0.5 T. The magnetic field reduces the concentration of the fouling constituent in the circulating fluid. The magnetic field attracts scale to the magnets, causing the scale to remain adjacent to the magnet and leave the circulating fluid. The magnetic field kills micro-organisms causing them to drop out of the circulating fluid. The dead micro-organisms that drop out of the circulating fluid form a solid. The solid collects in separation vessel 105 and is periodically removed by chemicals or by cleaning. In at least one embodiment of the present invention, effluent stream 18 passes through a filter (not shown) before exiting separation vessel 105. The filter prevents solids from leaving the separation vessel in stream 18. In at least one embodiment of the present invention, stream 18 passes through a filtration system (not shown) after exiting separation vessel 105.

The fouling constituent is present in the circulating fluid at a concentration. As the fouling constituent is removed from the circulating fluid by the magnetic field, the concentration of fouling constituents is reduced. In at least one embodiment, the removal of fouling constituents is dependent on the exposure time of the circulating fluid to the magnetic field. Coagulation efficiency is a measure of the concentration of fouling constituents before treatment and after treatment.

In at least one embodiment of the present invention, the magnetic separation unit 100 is run in batch mode, where effluent stream 18 is not continuously withdrawn and circulation pump 120 ensures that the fluid moves through and contacts the magnetic field, so that the fouling constituent in the fluid comes into contact with the magnetic field.

In at least one embodiment of the present invention, magnetic separation unit 100 includes sampling point 110. Sampling point 110 allows removal of sample 16. Sampling point 110 can be located in any part of magnetic separation unit 100 where sample 16 can be collected. Sample 16 contains fluid from magnetic separation unit 100 where sampling point 110 is located. The fluid in sample 16 has a concentration of the fouling constituent. In at least one embodiment of the present invention, sampling point 110 is located between separation vessel 105 and circulation pump 120, so that sampling point 110 allows removal of sample 16 from circulation feed 12. In an alternate embodiment of the present invention, sampling point 110 allows sample 16 to be removed from the interior cavity of the body of separation vessel 110. In at least one embodiment of the present invention, sampling point 110 includes a valve that is opened only when sample 16 is removed. In at least one embodiment of the present invention, magnetic separation unit 100 contains more than one sampling point 110, with at least one located on fouled process stream 10. Having more than one sampling point 110 provides means for determining efficiency of the separation process. Efficiency of the separation process is measured using the most probable number (MPN) method. The MPN method is a serial dilution method where 1 mL from the original sample is subdivided into 10 test tubes (or other container). Each subdivision is then diluted by a known factor. A separation process of the present invention is considered efficient when micro-organism count is less than or equal to $10^3$ cells/ml.

Sample 16 can be subjected to lab tests to obtain information about the fluid and the fouling constituent in the fluid. In at least one embodiment of the present invention, a measure of the concentration of the fouling constituent in sample 16 is obtained. In at least one embodiment of the present invention, sampling point 110 includes an analyzer system capable of measuring the concentration of fouling constituents in sample 16.

Effluent stream 18 exits separation vessel 105. Effluent stream 18 contains a reduced concentration of the fouling constituent as compared to fouled process stream 10. In at least one embodiment of the present invention, effluent stream 18 is withdrawn when a target concentration is measured in sample 16. In at least one embodiment of the present invention, effluent stream 18 feeds clean collection vessel 400. Clean collection vessel 400 receives effluent stream 18 and discharges clean stream 40. Clean stream 40 can be incorporated into other processes as needed. In at least one embodiment of the present invention, clean stream 40 is fed into a water distribution system.

The target concentration is the acceptable level of the fouling constituent in sample 16. In at least one embodiment of the present invention, the target concentration is a target microorganism concentration. The target concentration can be set by the efficiency of microbiological treatment unit 1, by the design parameters of magnetic separation unit 100, or by the use to be made of clean stream 40. For microorganisms, the target concentration is less than about 10,000 cells/ml of sample 16, alternately less than about 1000 cells/ml of sample 16, alternately less than about 500 cells/ml of sample 16, alternately less than about 100 cells/ml of sample 16, alternately less than about 50 cells/ml of sample 16, alternately less than about 10 cells/ml of sample 16, alternately less than about 5 cells/ml, and alternately less than about 1 cell/ml of sample 16. In at least one embodiment of the present invention, the target concentration is less than about 100 cells/ml of sample 16. In at least one embodiment of the present invention, the target microorganism concentration is 100 cells/ml of sample 16.

In at least one embodiment of the present invention, microbiological treatment unit 1 includes a holding vessel upstream of magnetic separation unit 100. Fouled process stream 10 feeds the holding vessel and a separation unit feed stream exits the holding vessel to magnetic separation unit 100. The holding vessel enables magnetic separation unit 100 to be operated as a batch process, while microbiological treatment unit 1 is a continuous process.

In at least one embodiment of the present invention, microbiological treatment unit 1 includes additional magnetic separation units 100. Microbiological treatment unit 1 can include one magnetic separation unit, alternately two magnetic separation units, alternately three magnetic separation units, alternately four magnetic separation units, alternately five magnetic separation units, and alternately more than five magnetic separation units. The number of additional magnetic separation units depends on the composition of fouled process stream 10, the types of fouling constituent present in fouled process stream 10, the target concentration of fouling constituent, and the process in which clean stream 40 will used. In at least one embodiment of the present invention, the additional magnetic separation units are arranged in series with the effluent stream from one magnetic separation unit feeding the next separation vessel in the series and the effluent stream from the last magnetic separation unit fed to clean collection vessel 400.

Figure 2:
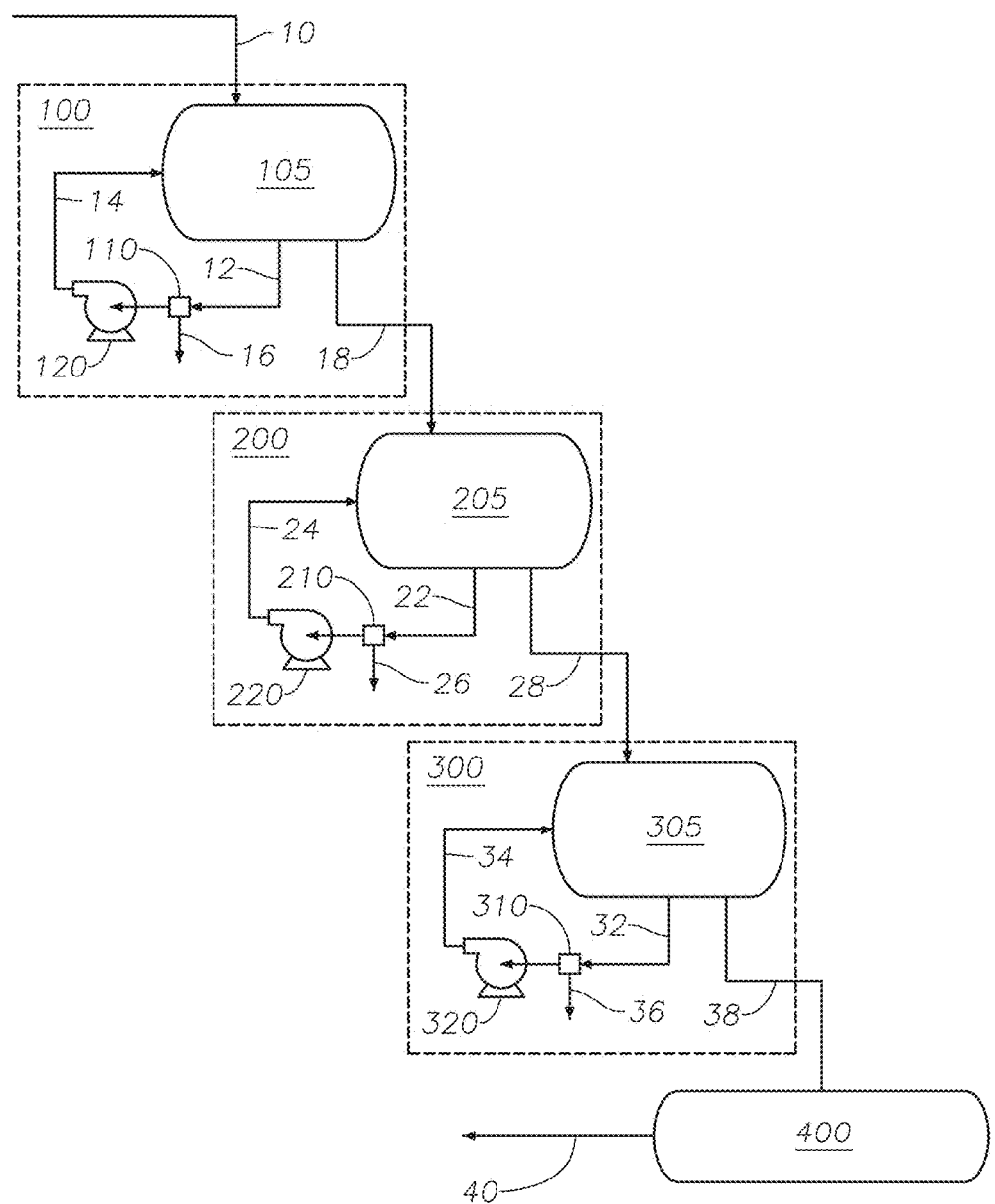
FIG. 2 is a flow diagram of an embodiment of the present invention.

FIG. 2 provides a flow diagram of an embodiment of the present invention containing additional magnetic separation units arranged in series. With reference to the elements previously described with reference to FIG. 1, fouled process stream 10 feeds separation vessel 105 of magnetic separation unit 100. Effluent 18 feeds separation vessel 205 of magnetic separation unit 200, magnetic separation unit 200 being the next magnetic separation unit in the series. Circulation pump 220 receives circulation feed 22 and recycles the fluid as circulation return 24. Sampling point 210 allows removal of sample 26. Effluent 28 feeds separation vessel 305 of magnetic separation unit 300, magnetic separation unit 300 being the next magnetic separation unit in the series. Circulation pump 320 receives circulation feed 32 and recycles the fluid as circulation return 34. Sampling point 310 allows removal of sample 36. Effluent 38 feeds collection vessel 400, magnetic separation unit 300 being the last magnetic separation unit in the series. In at least one embodiment of the present invention, effluents 18, 28, and 38 exit separation vessels 105, 205, and 305, respectively, only when the concentration of fouling constituent as measured in samples 16, 26, and 36 are at or below the target concentration, with each magnetic separation vessel having a distinct target concentration. In at least one embodiment of the present invention, each separation vessel 105, 205, 305, has a bypass line (not shown) that allows effluents 18, 28, or 38 to feed collection vessel 400 and by-pass the next magnetic separation unit in the series.

In at least one embodiment of the present invention, the additional magnetic separation units are arranged in parallel with a portion of fouled process stream 10 feeding each individual magnetic separation unit and the effluent stream from each individual magnetic separation unit being collected in collection vessel 400.

In at least one embodiment of the present invention, each effluent from each magnetic separation unit feeds an individual collection vessel.

In at least one embodiment of the present invention, multiple samples 16 are taken during the process to reduce the concentration of the fouling constituent. In at least one embodiment of the present invention, magnetic separation unit 100 operates for an exposure time and then sample 16 is removed. The exposure time is determined based on the nature of fouled process stream 10, the nature and concentration of fouling constituents in the circulating fluid, and the total number of magnetic separation units 100. In at least one embodiment of the present invention, the exposure time is greater than 1 hour.

In at least one embodiment of the present invention, microbiological treatment unit 1 reduces the concentration of fouling constituent in clean stream 40 as compared to fouled process stream 10 in the absence of biocide. In at least one embodiment of the present invention, microbiological treatment unit 1 is in the absence of biocide or other chemical means for treating process streams containing micro-organisms.

In at least one embodiment of the present invention, a standby magnetic separator unit aids in maintenance and cleaning of the operation magnetic separation unit. When the solids of dead microbes build-up in magnetic separation unit 100, fouled process stream 10 is redirected to the standby magnetic separator unit. The standby magnetic separator unit then operates as described with reference to magnetic separation unit 100, while cleaning operations are conducted on magnetic separation unit 100.

In at least one embodiment of the present invention, microbiological treatment unit 1 is in the absence of any protective covering over shaft 134 and magnets 136. Fluid in separation vessel 105 is in direct contact with magnets 136

EXAMPLES

Example 1

In example 1, mixed cultures of sulfate reducing bacteria (SRB) of *Desulfovibrio africanus* sp. and *Desulfovibrio alaskensis* were used. Freeze-dried samples of both cultures were obtained from the American Type Culture Collection (ATCC). The SRB cultures were cultivated in a modified Baar's medium (ATCC medium 1250). One (1) L of growth medium was used according to the composition of Table 1.

TABLE 1

Composition of Growth Medium

| Component | Amount Added(g) |
|---|---|
| Magnesium Sulfate | 2.0 |
| Sodium Citrate | 5.0 |
| Calcium Sulfate di-Hydrate | 1.0 |
| Ammonium Chloride | 1.0 |
| Sodium Chloride | 25.0 |
| di-Potassium Hydrogen Orthophosphate | 0.5 |
| Sodium Lactate 60% Syrup | 3.5 |
| Yeast Extract | 1.0 |

The pH of the growth medium was adjusted to 7.5 using 5M sodium hydroxide. The medium was then sterilized in an autoclave at 121° C. for 20 minutes. A filter-sterilized 5% ferrous ammonium sulfate was added to the medium before inoculation at a ratio of 0.1 ml ferrous ammonium sulfate to 5.0 ml of the growth medium. The SRB were incubated for 72 hours at 37° C. under an oxygen-free nitrogen headspace. Iron oxide, in nano-particle form, was introduced to the growth medium at different concentrations up to a maximum value of 0.6 mg/ml growth medium.

To prepare the test samples, serum vial glass bottles were autoclaved at 121° C. for 20 minutes and dried. In a sterilized laminar flow hood, 50 ml of sterilized modified Baar's growth medium was added to each bottle. The bottles were sealed with fitted rubber caps, purged for 30 minutes with pure nitrogen gas to establish an anaerobic environment, then inoculated with 1 ml of the SRB at $10^8$ cells/ml. Temperatures were maintained at 32° C. throughout the experiments.

Figure 3:
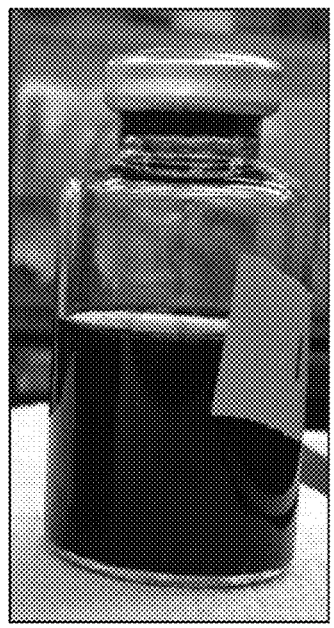
FIG. 3 is an image of the sulfate reducing bacteria (SRB) at maximum growth.
Figure 4:
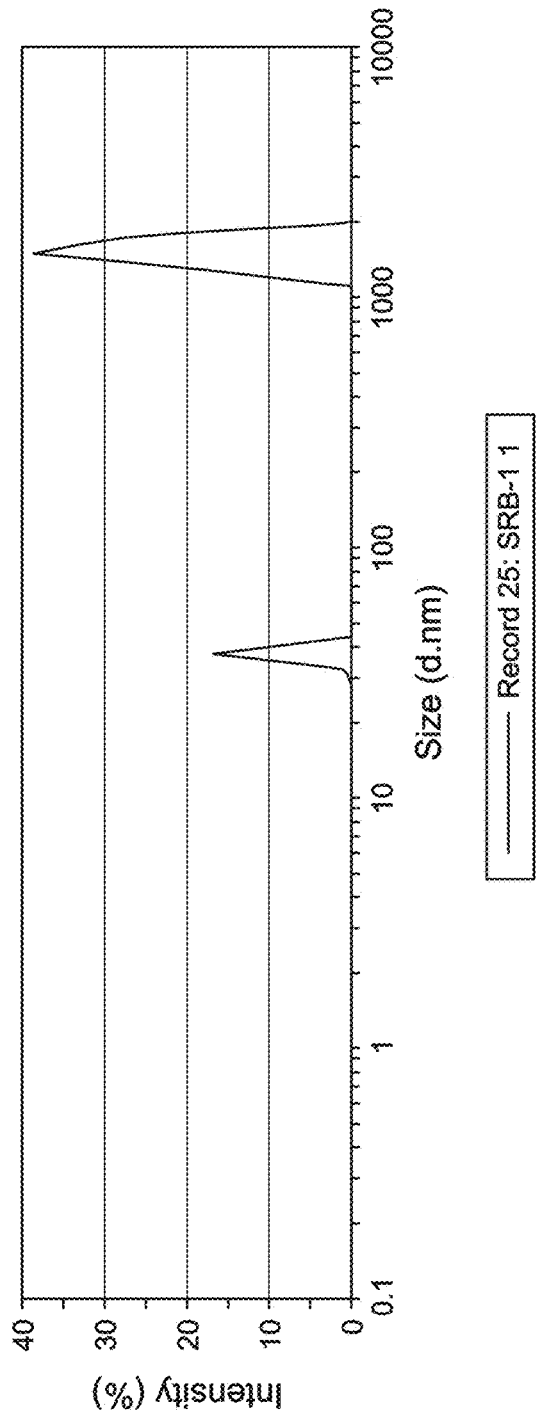
FIG. 4 is graphical representation of the size and distribution of the SRB.
Figure 5:
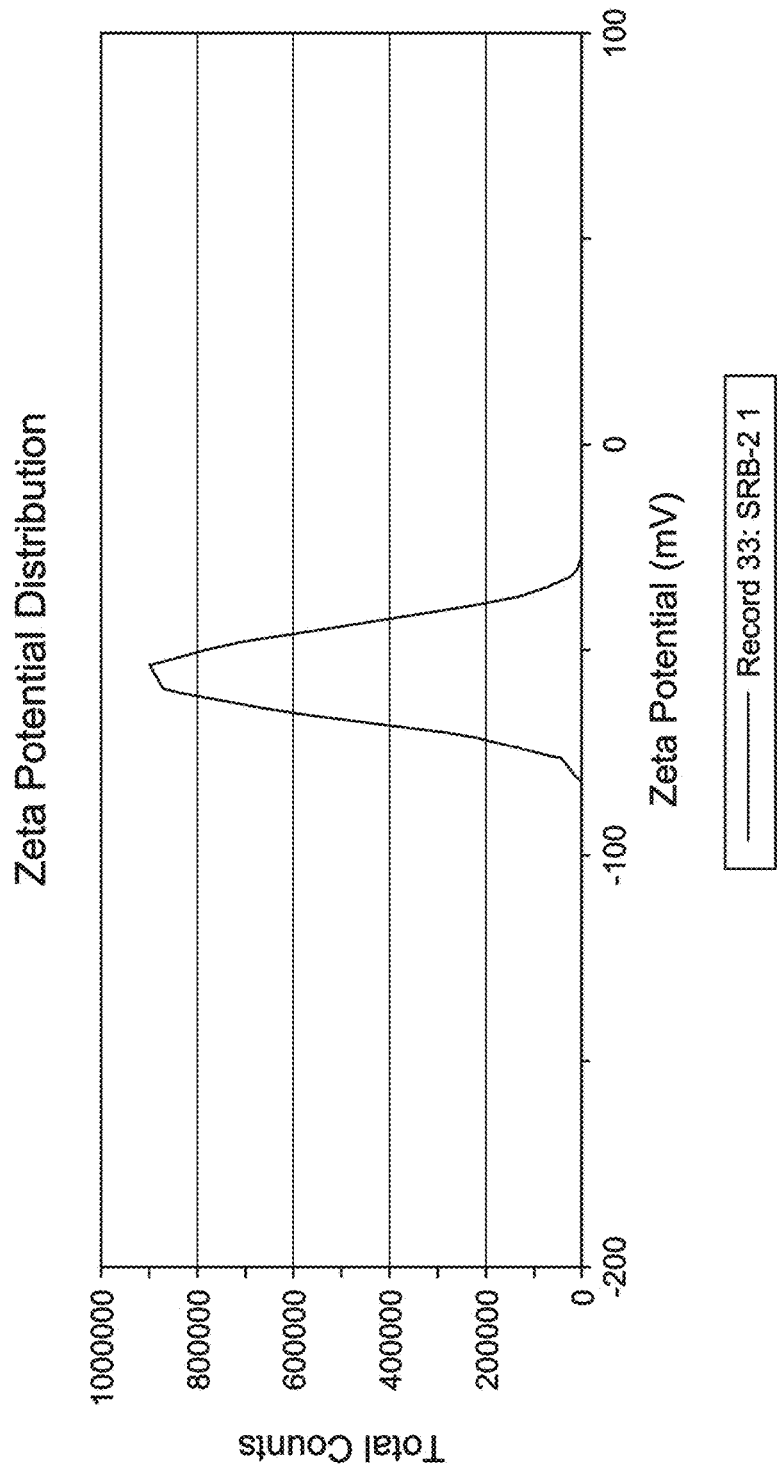
FIG. 5 is a graphical representation of the zeta potential measurements for SRB.

FIG. 3 is an image of the SRB at maximum growth. The microbial density was measured using optical density measurements via a digital spectrophotometer, see FIG. 4. The SRB zeta potential along with sizes were measured at a pH of 7 and a temperature of 37° C. using a microelectrophoretic apparatus Zeta Meter (Powereach Model JS94G), see FIG. 5.

Figure 6A:
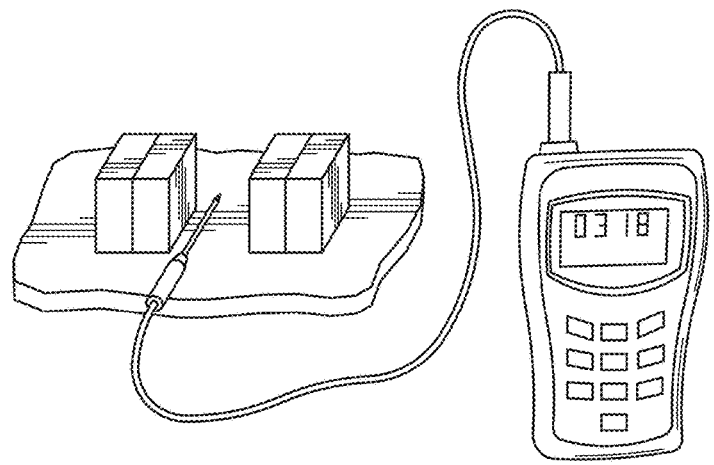
FIG. 6a is an image of a magnetic tower assembly.
Figure 6B:
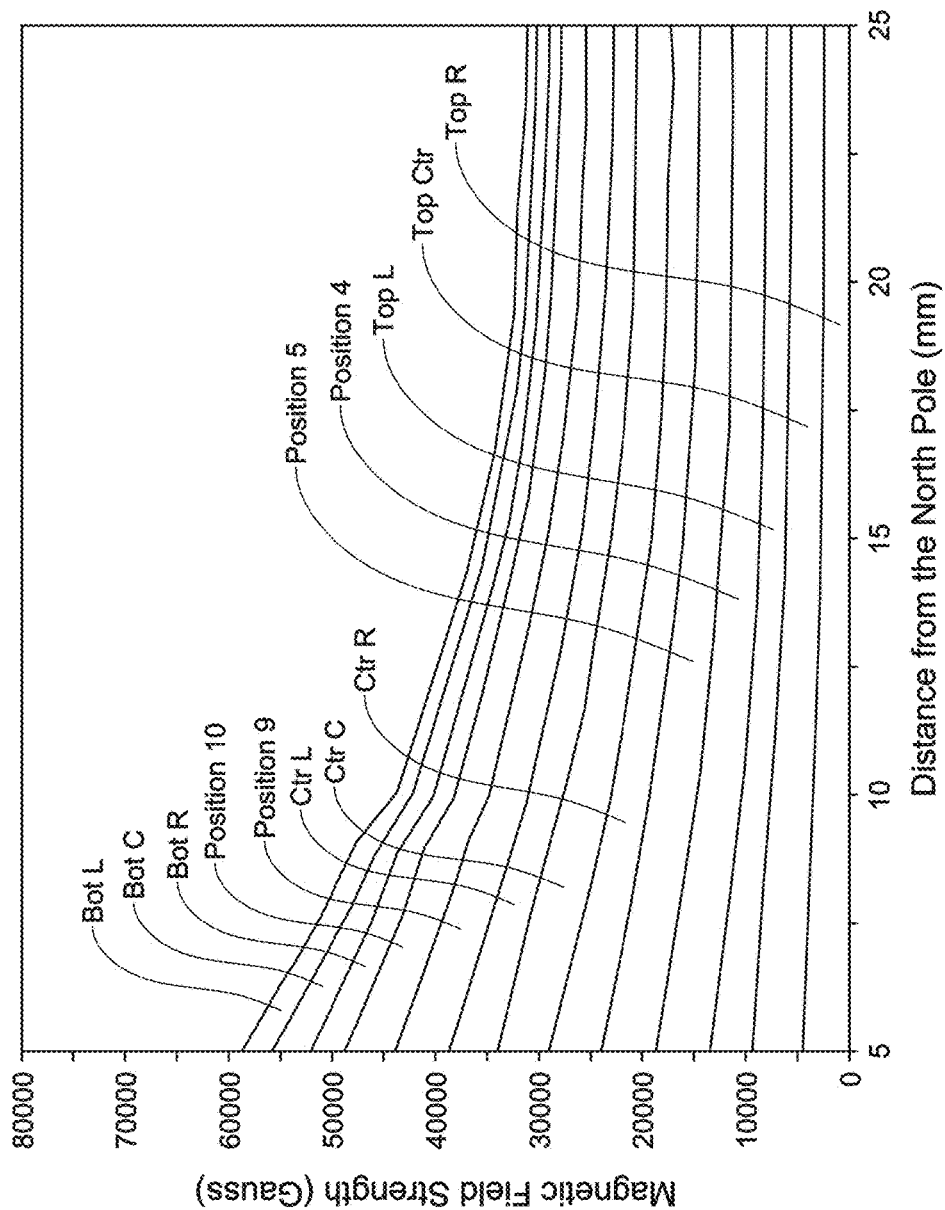

The conditions of a separation vessel and magnets were approximated using magnetic tower assemblies. Six different magnetic tower assemblies were used. In each assembly, rectangular neodymium magnetic blocks measuring 50.8 mm×50.8 mm×25.4 mm were stacked on a base support facing each other. The stacks were fixed on the base support with a 50 mm exposure gap in between each stack. The mounted stacks produced a 500 mT static magnetic field at the center of the assembly (between the stacks). See FIGS. 6a and 6b.

Figure 7:
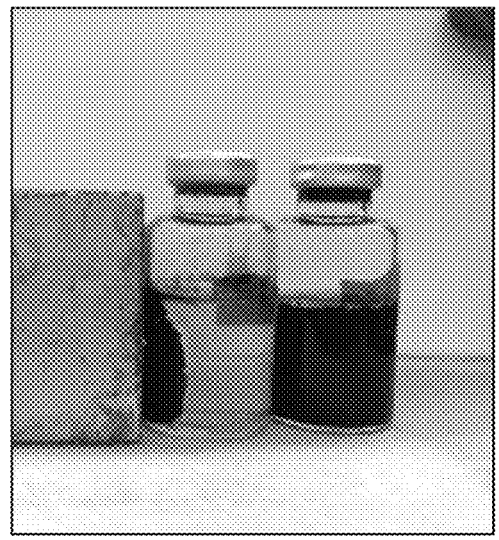
FIG. 7 is an image of a sample of the SRB next to a magnet.
Figure 8A:
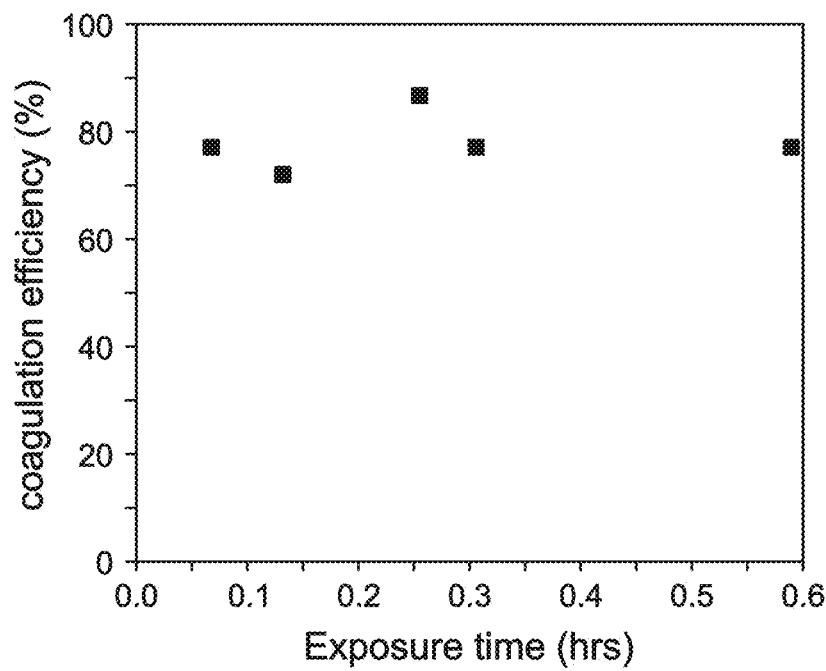
FIG. 8a is a graphical representation of the coagulation efficiency (%) as a function of exposure time.
Figure 8B:
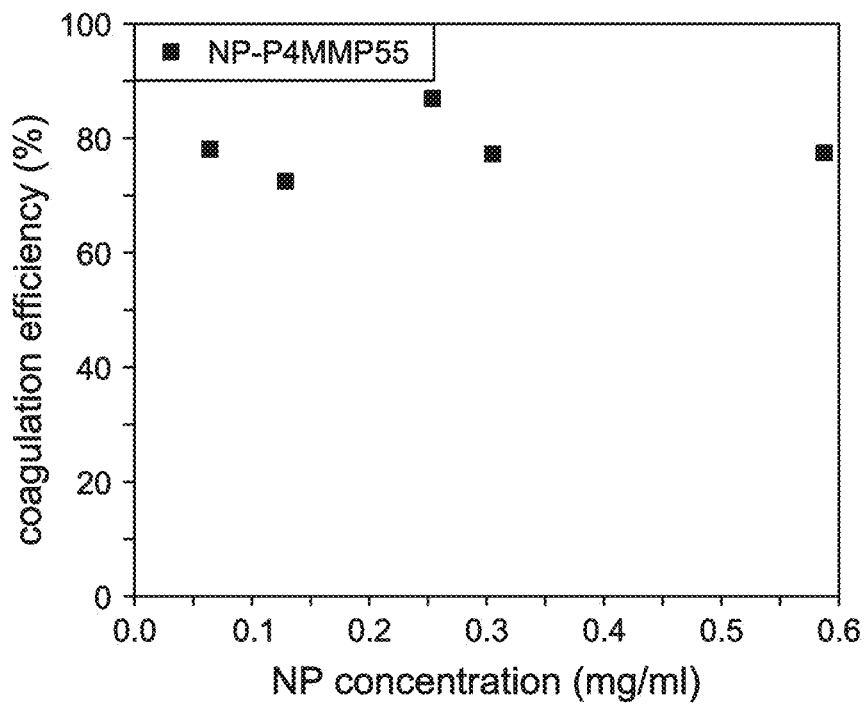
FIG. 8b is a graphical representation of the coagulation efficiency (%) as a function of iron oxide nano-particle concentration.

When the SRB growth in the bottles reached a concentration of $10^{10}$ cells/ml, the bottles were positioned in middle of a magnetic tower assembly for testing. Each different bottle was tested in a magnetic tower assemblies for a different exposure time to the magnetic field. FIGS. 8a and 8b relate the coagulation efficiency to exposure time and iron oxide nano-particle concentration. FIG. 7 shows the attraction between the SRB and the magnet. Without being bound to a specific theory, it is believed that the ferromagnetic iron oxide nano-particles added to the growth medium coat the SRB, and cause the SRB to be attracted to the magnetic tower assembly. In addition, it is believed that the SRB themselves have negative surface charges that cause the SRB to be attracted to the magnetic field of the magnetic tower assembly.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A microbiological treatment unit for cleaning a fouling constituent from a fouled process stream using a magnetic field, the microbiological treatment unit comprising:
    a magnetic separation unit, the magnetic separation unit configured to reduce a concentration of the fouling constituent in the fouled process stream to create an effluent stream, the magnetic separation unit comprising:
        a separation vessel, the separation vessel configured to receive the fouled process stream, the separation vessel having a body with an external surface, the body defining an interior cavity,
        more than one mounted magnet partially adjacent to the separation vessel, each mounted magnet configured to generate the magnetic field, such that the magnetic field encompasses the magnetic field generated by each mounted magnet, the magnetic field operable to remove the fouling constituent, each mounted magnet comprising:
            a magnet motor adjacent to the external surface of the separation vessel;
            a shaft connected to the magnet motor, the magnet motor configured to rotate the shaft, the shaft extending into the interior cavity of the body of the separation vessel; and
            a magnet connected to the shaft, the shaft configured to rotate the magnet, the magnet having a shape, the magnet configured to generate the magnetic field,
                wherein the rotation of the magnet generates the magnetic field,
        a circulation pump fluidly connected to the separation vessel, the circulation pump configured to receive a circulation feed from the separation vessel to produce a circulation return, wherein the circulation return is recycled to the separation vessel; and
        a sampling point fluidly connected to the separation vessel, the sampling point configured to allow removal of a sample, wherein the sample comprises a fluid from the separation vessel; and
    a clean collection vessel, the clean collection vessel configured to receive the effluent stream.

2. The microbiological treatment unit of claim 1, further comprising additional magnetic separation units, wherein the additional magnetic separation units are connected in series,
    wherein the effluent stream of a first magnetic separation unit is fed to a next magnetic separation unit in the series,
    wherein the effluent stream of a last magnetic separation unit in the series is fed to the clean collection vessel.

3. The microbiological treatment unit of claim 1, wherein the process stream is selected from the group consisting of water, hydrocarbons, and combinations thereof.

4. The microbiological treatment unit of claim 1, wherein the fouling constituent is selected from the group consisting of biological micro-organisms, paramagnetic scale, ferromagnetic scale, and combinations thereof.

5. The microbiological treatment unit of claim 1, wherein the magnet of each mounted magnet comprises neodymium.

6. The microbiological treatment unit of claim 1, wherein the shape of the magnet of each mounted magnet is a cylinder.

7. The microbiological treatment unit of claim 1, where each mounted magnet further comprises additional magnets, the additional magnets having an arrangement along the shaft of each mounted magnet, wherein the arrangement along the shaft is continuous, rows, or patterned.

8. The microbiological treatment unit of claim 1, wherein the sampling point is located between the separation vessel and the circulation pump.

9. The microbiological treatment unit of claim 6, wherein the shaft of each mounted magnet runs through the center of the cylinder, such that the magnet is affixed around the shaft.

* * * * *